United States Patent
Zhou et al.

(10) Patent No.: US 7,632,773 B2
(45) Date of Patent: Dec. 15, 2009

(54) METHODS FOR MANUFACTURING SUPPORTED CATALYST FROM A POROUS SUPPORT AND A NANOCATALYST SOLUTION

(75) Inventors: Zhenhua Zhou, Lawrenceville, NJ (US); Zhihua Wu, Lawrenceville, NJ (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 370 days.

(21) Appl. No.: 11/619,866

(22) Filed: Jan. 4, 2007

(65) Prior Publication Data

US 2008/0166288 A1 Jul. 10, 2008

(51) Int. Cl.
*B01J 21/00* (2006.01)
*B01J 23/38* (2006.01)
*B01J 31/28* (2006.01)

(52) U.S. Cl. .................. 502/152; 502/439; 502/325

(58) Field of Classification Search .................. 502/355, 502/100, 232, 350, 263, 242, 251, 87, 174, 502/159, 150, 168, 167, 152, 240, 258, 439, 502/325

See application file for complete search history.

(56) References Cited

U.S. PATENT DOCUMENTS

| | | | |
|---|---|---|---|
| 4,179,408 A | 12/1979 | Sanchez et al. | 502/8 |
| 4,390,456 A | 6/1983 | Sanchez et al. | 502/8 |
| 4,547,486 A | 10/1985 | Shyr | 502/333 |
| 5,391,292 A | 2/1995 | Schorfheide et al. | 208/140 |
| 5,500,202 A | 3/1996 | Germain et al. | 423/584 |
| 6,168,775 B1 | 1/2001 | Zhou et al. | 423/584 |
| 6,171,370 B1 | 1/2001 | Hirano et al. | 95/96 |
| 6,365,259 B1 | 4/2002 | Brundage et al. | 428/116 |
| 6,383,443 B1 | 5/2002 | Jeng et al. | 264/621 |
| 6,387,346 B1 | 5/2002 | Bertsch-Frank et al. | 423/584 |
| 6,500,968 B2 | 12/2002 | Zhou et al. | 549/531 |
| 6,500,969 B1 | 12/2002 | Zhou et al. | 549/531 |
| 6,534,661 B1 | 3/2003 | Zhou et al. | 549/531 |
| 6,576,214 B2 | 6/2003 | Zhou et al. | 423/584 |
| 6,964,756 B2 | 11/2005 | Addiego et al. | 423/628 |
| 7,045,481 B1 | 5/2006 | Parasher et al. | |
| 7,128,892 B2 | 10/2006 | Pinnavaia et al. | 423/700 |
| 2001/0050354 A1 | 12/2001 | Suh et al. | 252/373 |
| 2003/0176277 A1 | 9/2003 | Suh et al. | 502/180 |
| 2005/0014635 A1* | 1/2005 | Zhou et al. | 502/159 |
| 2006/0070915 A1 | 4/2006 | Euzen et al. | 208/111.3 |
| 2006/0229466 A1 | 10/2006 | Arhancet et al. | |

FOREIGN PATENT DOCUMENTS

| | | | |
|---|---|---|---|
| CA | 1068667 | | 12/1979 |
| JP | 6154598 | | 6/1994 |
| RU | 2032466 | * | 4/1996 |

* cited by examiner

*Primary Examiner*—Timothy C Vanoy
*Assistant Examiner*—Daniel Berns
(74) *Attorney, Agent, or Firm*—Workman Nydegger

(57) ABSTRACT

Supported catalysts are manufactured from a pretreated porous support material and a nanocatalyst solution of catalyst nanoparticles. The porous support material is pre-treated with a gaseous solvent (e.g., steam or alcohol) to protect the support material from cracking during impregnation of the nanocatalyst solution. The supported catalysts have more uniform size, lower attrition of metals during manufacturing and use, and improved distributions of metal loading compared to catalysts manufactured using known techniques. Hydrogen peroxide manufactured from such catalysts is less likely to be contaminated with catalyst metal.

20 Claims, No Drawings

METHODS FOR MANUFACTURING SUPPORTED CATALYST FROM A POROUS SUPPORT AND A NANOCATALYST SOLUTION

BACKGROUND OF THE INVENTION

1. The Field of the Invention

The present invention relates generally to supported catalysts and methods for making and using such catalysts (e.g., in the direct synthesis of hydrogen peroxide). More particularly, the present invention relates to the manufacture of supported catalyst using a porous support and a nanocatalyst solution.

2. The Related Technology

Transition metal (e.g., noble metal) catalysts play a very important role in numerous industrial chemical processes, including pharmaceuticals manufacturing, petroleum refining, and chemical synthesis, among others. Cost pressures and the need for improved synthesis routes have led to continued improvement in catalyst performance. For example, improvements in catalysts for the direct synthesis of hydrogen peroxide using oxygen and hydrogen have led to direct synthesis routes that are now economically feasible compared to the traditional synthesis routes using alkylanthroquinones.

Transition metal catalysts are typically small metal particles or crystallites supported on a support material. Since catalyst performance generally increases with decreased particle size, great efforts have been made to obtain catalysts with very small particle sizes. Recently, particle sizes of less than 10 nm have been achieved for some catalysts.

The catalyst particles are typically deposited on a catalyst support material. Catalyst supports are often porous materials with high surface areas. The high porosity and high surface area are needed to allow a sufficient number of catalyst particles to be loaded on the support material. The type of support material used and the characteristics of the support material often have a significant impact on catalytic performance. The selection of the support material can beneficially enable or undesirably limit the type of reactor or conditions in which the catalyst can be used. For example, to use a catalyst in some reactors the size of the catalyst can be important.

Another important performance characteristic of particle catalysts is selectivity. Many particle catalysts are inherently capable of catalyzing more than one reaction for a given reaction mixture. In many cases, the different reactions are catalyzed by distinct active sites on the catalyst particle. Catalysis is achieved as reactants bond with catalyst atoms at the surface of the particle. The arrangement of the exposed atoms may determine catalytic properties of the catalyst. While one crystal face exposure may catalyze a desired reaction, another crystal face exposure may catalyze an undesired reaction.

Recently, manufacturing techniques have been developed that allow catalysts particles to be formed with a controlled crystal face exposure. Examples of supported nanocatalysts are disclosed in U.S. Pat. Nos. 7,045,479 and 7,011,807. The supported catalyst particles can be manufactured using an organic control agent. The control agent molecules are reacted with catalyst atoms in solution to form organometallic complexes. The complexed atoms are then allowed or caused to form a colloidal suspension and subsequently nanoparticles. As the nanoparticles form, the control agent molecules influence the crystal face exposure. Particles formed using this method have shown dramatic improvements in selectivity, reduced particle size, and improved particle stability.

While these recent improvements in catalyst performance have been substantial, there is still a need for improved catalyst synthesis routes and improved catalyst performance. However, it is often very difficult to know what feature of the catalyst or reaction system can or should be improved. Many in the art have focused on reducing catalyst particle size because it is relatively easy to predict an improvement based on reduced particle size. There are, however, many factors that can affect the actual performance of a catalyst in a reactor system.

BRIEF SUMMARY OF THE INVENTION

Embodiments of the invention are directed to methods for manufacturing supported catalysts that have reduced attrition during use (e.g., when used in the direct synthesis of hydrogen peroxide). The supported catalysts are manufactured from a porous support material and a nanocatalyst solution. The nanocatalyst solution is used to impregnate the support material with catalyst nanoparticles. In the method of the invention, the porous support material is pre-treated with a gaseous solvent (e.g., steam) before impregnating the support the nanocatalyst solution. Surprisingly, nanocatalysts manufactured using the pre-treated porous support are significantly less susceptible to catalyst attrition and are unexpectedly more active initially and over time. Reducing catalyst attrition improves yields and the costs associated with manufacturing and using the supported catalysts.

The support materials used in the invention are small porous structures such as those suitable for use in catalytic reactors including fixed bed, moving bed, slurry bed, fluidized bed, bubble bed, and the like. Examples of suitable structures include spheres, cylinders, pellets, beads, rings, trilobes, stars, and the like. The structures can be extruded or shaped using known techniques. The support structures typically have a diameter less than 100 mm, more preferably less than 50 mm. The small size and porous nature of the support material give it a high surface area for depositing nanocatalyst particles.

Prior to impregnating the support with the nanocatalyst solution, the support material is pretreated with a gaseous solvent such as, but not limited to, steam. The pretreatment step is typically carried out by first heating a dry support material. The heated, dry support material is then exposed to the gaseous solvent. Exposing the support material to a gaseous solvent is carried out at a concentration and temperature that allows wetting of the support material without causing cracking.

Following pretreatment of the support, a nanocatalyst solution is applied to the support material to form or deposit catalyst nanoparticles on the support. The nanocatalyst solution is manufactured from a liquid solvent, soluble catalyst atoms, and an organic control agent. The organic control agent molecules are reacted with the catalyst atoms to form organometallic complexes, which are then allowed or caused to form nanocatalyst particles.

The supported nanocatalyst solution and support are contacted while at least a portion of the pretreatment solvent remains on the support material. It is believed that the pretreatment solvent remaining in the pores of the support material can protect the support material from localized expansion caused by the initial wetting of the otherwise dry catalyst support.

The pretreatment and impregnation steps of the invention allow supported catalysts to be prepared that have low metal attrition rates during catalyst manufacturing compared to catalysts that are prepared without pretreatment of the support. Lower attrition during catalyst manufacturing improves the yield of useable catalyst and reduces manufacturing costs.

Surprisingly, catalysts manufactured using a pretreatment of gaseous solvent according to the invention show improved performance when used in the direct synthesis of hydrogen peroxide. It is believed that the improved catalyst performance is due at least in part to a more even distribution of nanocatalyst particles on the support material. In addition, maintaining the structural integrity of the catalyst support in the direct synthesis reactor is advantageous for minimizing catalyst contamination and/or plugging in reactors downstream from the direct synthesis reactors where the direct synthesis reactors are used in multi-step, multi-reactor systems.

These and other advantages and features of the present invention will become more fully apparent from the following description and appended claims as set forth hereinafter.

DETAILED DESCRIPTION OF EXEMPLARY EMBODIMENTS

I. Introduction and Definitions

Embodiments of the invention are directed to methods for manufacturing supported catalysts with improved structural integrity and the use of these supported catalysts in a reactor. The supported catalysts are manufactured from a porous support material and a nanocatalyst suspension. The nanocatalyst solution is used to impregnate the support material with catalyst nanoparticles. In the method of the invention, the porous support material is pre-treated with a gaseous solvent (e.g., steam) to protect the support material from cracking during impregnation with the colloidal suspension.

The term "crystal face" refers to the top or outer layer of active catalyst atoms within a catalyst crystal. The terms "crystal face exposure" and "crystal face exposition" refer to the specific arrangement of catalyst atoms within a particular crystal face (e.g., low index crystal face exposures (100), (110), and (111)).

The term "particle size" refers to average particle size and "nanoparticle" refers to a particle having a particle size between about 1 nm and about 1000 nm.

The term "nanocatalyst solution" shall be broadly understood to include true solutions, colloids, and suspensions.

II. Components Used to Make Metal-Containing Colloids and Supported Catalysts

A. Support Materials

The support materials are highly porous inorganic materials. The support material is typically selected to have a particular composition, particle size and shape, surface area, and initial crush strength. Examples of suitable materials that can be used as support materials include alumina, silica, titania, kieselguhr, diatomaceous earth, bentonite, clay, zirconia, magnesia, metal oxides, zeolites, and calcium carbonate.

The shape of the support material can affect the performance of the catalyst during use. In one embodiment, the shapes used in the invention are particulates. Examples of suitable particulate structures include spheres, cylinders, pellets, beads, rings, trilobes, stars, and the like. In one embodiment the particulate support materials have an average particle size of less than 100 mm, more preferably less than 50 mm and most preferably less than 10 mm. Alternatively, the particulate support has a diameter in a range from about 100 nm to about 20 mm, alternatively from about 1 mm to about 10 mm, or in yet another embodiment from about 1 mm to about 5 mm. The surface area of the support can range from about 1 $m^2$/g to about 2,000 $m^2$/g, more preferably from about 20 $m^2$/g to about 500 $m^2$/g. In one example embodiment the support material is silica gel. Silica gel can be a preferred support for its high absorption capacity and availability. However, the invention is not limited to silica gel supports.

B. Metal Ions

Any metals or group of metals that can react to form a complex with the organic control agent molecules can be used to form the metal colloids according to the present invention. In a preferred embodiment, the metal is a transition metal. Transition metals include base transition metals, noble metals, and rare earth metals.

Examples of suitable base transition metals include, but are not limited to, titanium, vanadium, chromium, manganese, iron, cobalt, nickel, copper, zinc, zirconium, molybdenum, tin, antimony, tungsten, and the like. These may be used alone, in various combinations with each other, or in combinations with other elements.

Examples of noble metals, also referred to as platinum-group metals, include platinum, palladium, iridium, gold, osmium, ruthenium, rhodium, rhenium, and the like. These may be used alone, in various combinations with each other, or in combinations with other elements.

Examples of rare earth metals include, but are not limited to, lanthanum and cerium. These may be used alone, in various combinations with each other, or in combinations with other elements.

For the manufacture of hydrogen peroxide catalysts, the metal ions typically include palladium and/or platinum.

C. Organic Control Agents and Organic Control Agent Molecules

The organic control agent, also referred to as a control agent or an organic agent, is selected to promote the formation of nanocatalyst particles that have a desired size and/or crystal face exposure. The control agent molecules react with the metal ions to form ligands complexed with the metal ions. During formation of the metal particles, the control agent can influence the arrangement and bonding of the metal atoms, thereby causing formation of particles with a particular size and/or crystal face exposure (e.g., (110) type or (111) type).

Control agents suitable for bonding metal ions include a variety of small organic molecules, polymers and oligomers. The control agent interacts and bonds with metal ions dissolved or dispersed within an appropriate solvent or carrier. Bonding can occur through various suitable mechanisms, including ionic bonding, covalent bonding, Van der Waals interaction/bonding, lone pair electron bonding, or hydrogen bonding.

To provide the bonding between the control agent molecules and the metal ions, the control agent molecules include one or more appropriate functional groups. In one embodiment, the functional groups comprise a carbon atom bonded to at least one electron-rich atom that is more electronegative than the carbon atom and that is able to donate one or more electrons so as to form a bond or attraction with a metal ion. Preferred control agents include functional groups which have either a charge or one or more lone pairs of electrons that can be used to complex a metal ion. These functional groups allow the control agent to have a strong binding interaction with the metal ions.

In an exemplary embodiment, the functional groups of the control agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide. The control agent can be monofunctional, bifunctional, or polyfunctional.

Examples of suitable monofunctional control agents include carboxylic acids such as formic acid and acetic acid. Useful bifunctional control agents include diacids such as oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional control agents include sugars such as glucose, polyfunctional carboxylic acids such as citric acid, EDTA, pectins, cellulose, and the like. Other useful control agents include ethanolamine, mercaptoethanol, 2-mercaptoacetate, amino acids, such as glycine, and sulfonic acids, such as sulfobenzyl alcohol, sulfobenzoic acid, sulfobenzyl thiol, and sulfobenzyl amine. The control agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

Depending on the desired stability of the nanocatalyst particles on the support material, the control agent can be selected to bond (e.g., covalently bond) with the support material so as to anchor or tether the nanocatalyst particles and/or atoms to the support material. While the control agent has the ability to inhibit agglomeration of the nanocatalyst particles in the absence of anchoring, chemically bonding the nanocatalyst particles to the support material through a ligand is a particularly effective mechanism for preventing agglomeration.

Suitable functional groups for bonding with the support are the same types of functional groups as those suitable for bonding to the metal ions. However, control agent molecules can have different functional groups for bonding to the support and also for bonding to the metal ions.

The control agent solution and optionally the support material can control which face of the catalyst crystallite is predominantly exposed. Examples of low-index crystal faces that can be controllably exposed include the (110) crystal face of face centered cubic (FCC) crystal lattice, the (110) crystal face of the hexagonal closed packed (HCP) crystal lattices, the (101), (122), or (120) crystal face of an HCP crystal lattice, and the (112), (122) or (123) crystal face of a body-centered cubic (BCC) crystal lattice. The foregoing crystal face exposures all have a coordination structure where each active surface atom is coordinated with only two other active surface atoms. For purposes of the present invention, these coordination structures are collectively referred to as a "(110) type" crystal face exposure. A predominately (110) type crystal face exposure has been found to be advantageous for manufacturing hydrogen peroxide.

A control agent can also be selected to cause formation of other types of coordination structures. For example, the (111) crystal face of the FCC crystal lattice has active surface atoms with six neighboring (i.e. coordinated) surface atoms. Other types of crystal lattices have crystal face exposures with this type of coordination structure. For purposes of the present invention, these coordination structures are collectively referred to as "(111) type" crystal face exposure.

In all of the above crystal face designations, it will be understood by those skilled in the art that each named crystal face has many alternate Miller index designations, each of which are equivalent to those listed above (e.g., the (101) and (011) crystal faces of the FCC lattice are equivalent to the (110) crystal face). All of the unnamed but equivalent crystal face designations are understood to be included within the definitions of a "(111) type" or a "(110) type" crystal face exposure.

It is, at least theoretically, not essential for the catalytically active atoms to form a catalyst crystal per se, only that a preponderance of the top or outer layer of atoms in the catalyst particles attached to the support have the desired coordination structure. It may be possible to obtain increased reaction specificity regardless of whether the atoms are aligned as straight rows, in a zig-zag formation, or in less ordered rows having no uniform shape so long as the desired coordination structure is achieved. According to one embodiment, at least about 50% of the catalytically active atoms in the nanocatalyst particles will advantageously have the selected crystal face exposure (i.e., coordination structure). More preferably at least about 70%, even more preferably about 90%, and most preferably at least about 95% of the active surface atoms will have the selected crystal face exposure. Reaction selectivity would theoretically be expected to be maximized in the case where 100% of the active surface atoms have the desired crystal face exposure.

D. Solvents and Chemical Modifiers

The nanocatalyst particles are prepared in a solution that can be applied to a catalyst support material. The nanocatalyst solution can contain various solvents, including water and organic solvents. Solvents participate in catalyst formation by providing a solution for the interaction of metal ions and the control agent molecules. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

Other chemical modifiers may also be included in the nanocatalyst solution. For example, acids or bases may be added to adjust the pH of the mixture. It is also possible to add acids and bases as a solid material. For example, ion exchange resins that have basic or acid functional groups can be used. The solid material can be easily separated from the final colloid using simple techniques such as centrifugation and filtration. Surfactants may be added to adjust the surface tension of the mixture, or to stabilize the nanoparticles.

E. Reducing Agent

A reducing agent can be used to reduce complexed metal ions to a lower oxidation state. In some cases, reducing the metal atoms causes formation of the nanoparticles. Any compound capable of reducing the complexed metal ions can be used. In a preferred embodiment, the reducing agent is hydrogen. Other suitable reducing agents include small organic molecules such as formaldehyde, formic acid, methanol, ethylene, and hydrides such as lithium aluminum hydride and sodium borohydride.

III. Methods of Making Supported Catalyst

Example methods for manufacturing supported nanocatalyst according to the invention can be broadly summarized as follows. First, one or more types of support materials are pre-treated with a gaseous solvent to prevent cracking. Second, nanocatalyst solution is prepared from a liquid solvent, a plurality of catalyst atoms, and a control agent. Third a supported catalyst is formed by impregnating the pre-treated solution with the nanocatalyst solution. And Fourth, the supported catalyst is optionally dried and/or activated for use.

A. Pretreatment of Support Material

The pretreatment of the support is performed by first selecting a porous support material. The support material is typically selected to have a sufficient surface area for supporting the desired loading and type of nanocatalyst particles. In addition, the support is selected to have a size and shape that is suitable for the particular application that the supported catalyst will be used in (e.g., a fixed bed reactor for synthesizing hydrogen peroxide). Those skilled in the art are familiar with selecting porous support materials to provide a proper metal loading, size, and shape for various reactions and reactor configurations.

The porous support material is then pretreated to prevent cracking and to maintain the structural integrity of the porous support material during the manufacture of the supported nanocatalyst. The support material is placed in a reactor or other suitable vessel and exposed to a gaseous solvent for a sufficient time to allow an amount of the gaseous solvent to be adsorbed into the pores of the support material. The gaseous solvent slowly wets the surface of the support material thereby allowing heat to escape the material without causing the support material to crack.

Any gaseous solvent can be used so long as it does not cause significant cracking when it is adsorbed under the conditions described herein. Suitable gaseous solvents include steam, gaseous methanol, gaseous ethanol, combinations of these, and the like. The gaseous solvent can be the same or different than the liquid solvent used in the nanocatalyst solution that is applied to the pretreated support material.

The time needed to wet the surface of the support material will depend on the porosity of the support material, pore size, composition of the support material, the particular gaseous solvent being used, and the temperature and pressure at which the gaseous solvent is applied. Generally, the more slowly the gaseous solvent is applied the lower the probability that the gaseous solvent will condense and cause cracking. In an examplary embodiment, steam is applied at 1 atm. to the support material for greater than 2 hours, more preferably greater than 10 hours and most preferably greater than 20 hours.

In one embodiment, the support material and/or the container used to carry out the pretreatment is heated prior to exposing the support material to the gaseous solvent. Heating the support material and/or its holding vessel can prevent the gaseous solvent from condensing and cracking the support before the pores have had a chance to be wetted by the gaseous solvent.

B. Formation of Nanocatalyst Solution

The nanocatalyst solution is generally formed by first dissolving the catalyst atoms and control agent in an appropriate solvent or carrier and allowing the catalyst atoms to recombine as metal complexes in solution or suspension. The metal complexes are then allowed or caused to form nanoparticles.

The catalyst atoms can be provided in any form so as to be soluble or dispersible in the solvent or carrier that is used to form the catalyst precursor. For example, catalyst atoms can be provided as metal salts that are readily dissolvable in the solvent or carrier. It may be advantageous to use metal chlorides and nitrates, since metal chlorides and nitrates are typically more soluble than other metal salts.

The catalyst atoms can be added to the solvent or carrier singly or in combination. In general, the composition of the primary metal nanoparticles will be determined by the types of catalyst atoms added to the precursor solution. Therefore, control of the amounts of metal salts added to the precursor solution provides a convenient method to control the relative concentrations of different types of catalyst atoms.

The control agent can be selected to promote formation of nanoparticles with a desired size and/or crystal face exposure. It has been found that straight chain oligomers and polymers have a tendency to form particles with a (110) type crystal face exposure (e.g., unbranched polyacrylic acid). If a (111) type crystal face exposure is desired, small organic molecules or highly branched polymers can be used (e.g., glycolic acid).

In a preferred embodiment, the control agent is selected to form catalyst particles with a (110) type crystal face exposure for manufacturing hydrogen peroxide. An example of a suitable control agent for forming nanoparticles with selective (110) crystal face exposure is polyacrylic acid having a molecular weight of about 1200 MW and minimal or no branching.

The control agent is added to the solvent or carrier in a manner so as to facilitate association of the control agent with the catalyst atoms in order to form a catalyst precursor. Some control agents may themselves be soluble in the solvent or carrier. In the case of control agents that include carboxylic acid groups, it may be advantageous to form a metal salt of the acids (e.g., an alkali or alkaline earth metal salt). For example, polyacrylic acid can be provided as a sodium polyacrylate salt, which is both readily soluble in aqueous solvent systems and able to react with catalyst metal salts to form a metal-polyacrylate complex that may be soluble or which may form a suspension within the solvent or carrier.

In addition to the characteristics of the control agent, it can also be advantageous to control the molar ratio of control agent to the catalyst atoms in a catalyst suspension. A more useful measurement is the molar ratio between control agent functional groups and catalyst atoms. For example, in the case of a divalent metal ion two molar equivalents of a monovalent functional group would be necessary to provide the theoretical stoichiometric ratio. Typically the molar ratio of control agent functional groups to catalyst atoms is preferably in a range of about 0.001:1 to about 50:1. For hydrogen peroxide catalysts the ratio is advantageously in a range of about 0.5:1 to about 40:1, more preferably in a range from about 1:1 to about 35:1, and most preferably in a range of about 3:1 to about 30:1.

Once the metal atoms are complexed, the metal complexes are allowed or caused to form nanoparticles. In some cases, the nanoparticles may be crystalline and/or in a final coordination structure while in the nanocatalyst solution. In other embodiments, the particle formation may be intermediate. In one embodiment, nanoparticles are allowed to form by simply letting the precursor composition sit. In this embodiment, components in the precursor composition (e.g., solvent) may serve as a reducing agent or otherwise facilitate formation of the nanoparticles. In an alternative embodiment, a reducing agent (e.g., hydrogen) can be added to the nanocatalyst solution to induce particle formation or to cause particle formation to happen more rapidly.

In some cases, particle formation or modifications of the particle structure may occur in the presence of the support material. In some cases the support material may even influence the arrangement of atoms and/or influence the size of the resulting nanocatalyst particles. In one embodiment, the control agent can be bonded to the support material prior to forming a complex with the metal ions. This method is useful when the bonding of the control agent to the support is beneficial to particle formation and where the presence of the support material does not adversely affect the deposition of the secondary metal on the primary metal nanoparticles.

C. Impregnating Pretreated Support with Nanocatalyst Solution

The nanocatalyst solution is impregnated into or otherwise applied to the pre-treated support material. Depending on the physical form of the solid support, the process of contacting or applying the nanocatalyst solution to the support may be accomplished by a variety of methods. For example, the support may be submerged or dipped into the nanocatalyst solution. Alternatively, the nanocatalyst solution may be sprayed, poured, painted, or otherwise applied to the support, such as by incipient wetness impregnation. Thereafter, the solvent or carrier is removed, optionally in connection with a reaction step that causes the control agent to become chemically bonded or adhered to the support. Either way, the process yields a supported catalyst or an intermediate supported catalyst composition.

Metal loadings of the catalyst component on the support material can vary depending on the intended use of the supported catalyst. In a preferred embodiment, the metal loading is between about 0.01% and about 10% by weight, and more preferably between about 0.05% and about 5% by weight. These loading amounts are useful for catalysts for direct synthesis of hydrogen peroxide, for example. In many cases it can be advantageous to have metal loadings of at least about 0.1 wt %.

The use of the control agent allows for the formation of very small and uniform nanoparticles. In general, the nanocatalyst particles formed in the presence of the control agent are preferably less than about 20 nm in size. In some cases, the nanocatalyst particles may be atomically dispersed. The nanocatalyst particles more preferably have an average particle size less than about 15 nm, and most preferably less than about 10 nm.

D. Activating Nanocatalyst Particles

If desired, the catalyst nanoparticles can be reduced to activate the catalyst prior to use. Examples of suitable reducing agents include but are not limited to, hydrogen, lithium aluminum hydride, sodium hydride, sodium borohydride, sodium bisulfite, sodium thiosulfate, hydroquinone, methanol, aldehydes, carbon monoxide, ammonia, and the like. Hydrogen is preferred. The reduction process may be conducted at a temperature between 20° C. and 600° C.

IV. Methods of Manufacturing Hydrogen Peroxide

The supported catalysts of the present invention are particularly advantageous for the direct synthesis of hydrogen peroxide from hydrogen and oxygen. In a preferred embodiment, hydrogen peroxide promoting catalysts manufactured according to the present invention include a combination of palladium and platinum. In addition, the catalyst nanoparticles are preferably controllably formed to have a (110) type crystal face exposure.

The catalysts of the present invention can be used in any type of reactor suitable for the direct synthesis of hydrogen peroxide. Suitable reactors include fixed bed, ebullated bed, and slurry reactors. In a preferred embodiment, the catalysts of the present invention are loaded into a fixed bed or ebullated bed reactor for hydrogen peroxide production. The use of the catalysts of the present invention in a fixed bed or ebullated bed reactor facilitates the recovery and regeneration of the catalyst. Furthermore, maintaining the structural integrity of the support using the pretreatment step of the invention is particularly advantageous for using the supported catalysts in fixed bed and ebullated bed reactors.

To load the catalysts in a fixed bed or ebullated bed reactor, the supported catalysts are manufactured to have a size and/or shape suitable for a fixed bed or ebullated bed. For example, the supported catalysts can be manufactured into particulates such as beads or spheres that have a size suitable for use in a fixed bed or fluidized bed reactor. In an exemplary embodiment, the particulate has a nominal dimension of at least about 0.5 mm, and more preferably at least about 1 mm. Alternatively, the support material can be extruded to make a part with dimensions that are suitable for use in any size or shaped fixed bed reactor.

Extruding, crushing or otherwise shaping the support material for use in a particular type of reactor is typically done before supporting the nanocatalyst onto the support material such that the nanocatalyst particles are distributed over substantially the entire support surface that is exposed in the reactor.

Once the supported catalyst is placed into a suitable reactor, hydrogen peroxide can be directly synthesized by introducing a feedstream of hydrogen gas and molecular oxygen. In an exemplary embodiment, hydrogen is introduced into the reactor in a concentration less than the flammability limit of hydrogen. The oxygen concentration preferably ranges from about 5% to about 97% by volume, more preferably from about 10% to about 80%, and most preferably from about 20% to about 60%. For concentrations of oxygen greater than about 25%, it is advantageous to use an inorganic support to avoid oxidation of the support.

The supported catalysts of the present invention have metal loadings and suitable activity for the efficient production of hydrogen peroxide at low hydrogen concentrations. Because the metal component of the catalyst material is anchored to the support material, the supported catalysts have extended life and are easily recovered and regenerated. For reactors such as fixed bed and fluidized bed reactors, the supported catalysts are particularly easy to recover, thereby reducing ongoing cost of hydrogen peroxide production.

V. Examples

The following examples are exemplary procedures for manufacturing supported catalyst according to the invention and for manufacturing hydrogen peroxide using these catalysts.

Example 1

Catalyst Preparation

Example 1 describes a method for preparing a palladium-platinum catalyst supported on silica gel. A nanocatalyst solution was prepared using the following formula: a control agent solution was made by diluting 2250.4 grams of 45% w/w polyacrylic acid sodium salt (1200 MW) solution with DI-$H_2O$ to 10.0 L., a palladium solution was made by diluting 501.71 g of a concentrated $PdCl_2$ solution (17.95% w/w Pd solution) with DI-$H_2O$ to 10.0 L; a platinum solution was made by diluting 7.22 g of a concentrated $H_2PtCl_6$ solution (24.97% w/w Pt solution) with DI-$H_2O$ to 2.0 L; and an acid solution was made by diluting 13.51 g of 37% HCl acid with DI-$H_2O$ to 2.0 L.

The nanocatalyst solution was prepared by mixing the platinum solution with the palladium solution and 2.0 L of water to obtain a platinum-palladium solution of 14.0 L. The acid solution was mixed with the platinum-palladium solution and 4.0 L of water and stirred for 1 hour. The control agent solution was added to this solution and stirred for 1 hour and then purged with $N_2$ at over 300 ml/min for 6 hours, then purged with $H_2$ at over 300 ml/min, continuously for over 10 hours. During purging with $H_2$, platinum-palladium colloidal nanoparticles formed.

Next a silica gel support material was pre-treated with steam. A 125 liter glass reactor was used to treat the dry silicon gel (PlusPharma, Inc). The reactor was preheated for one hour before loading the support. Then, 45 kg of dry silica gel (particle size 1.7-2.5 mm, BET surface of 313 $m^2/g$) was loaded into the reactor and heated to 180° F. and held for one hour. Then steam was introduced into the reactor from the bottom of the column and kept for 18 hours. After 10 hours continuous steaming, four condensers with flow air as coolant were put on the top of reactor and part of the steam was condensed. After 18 hours continuous steaming, the support was rinsed with ~40 kg of DI-$H_2O$ four times and the free water was drained. The support was then treated with sulfuric acid. 65 kg of 94 wt % sulfuric acid was pumped into the reactor. The system temperature was raised to 270° F. and held at this temperature for 17 hours. After sulfonation, the support was rinsed four times to remove free sulfuric acid.

The pre-treated support and the nanocatalyst solution were then used to prepare the supported catalyst. To prepare the supported catalyst, 60 kg of the pretreated silica gel support was placed in a glass lined rotating dryer. 72 kg of the nanocatalyst solution was pumped into this dryer. The resulting solution rotated continuously and the jacket steam heater was held at 208° F. and the over heat air was kept at 590° F. This heating and drying was performed for about 6 hours and the jacket temperature was decreased to 120° C. and held for 15 hours.

The catalyst was then reduced with hydrogen gas using the following procedure: (i) purge at room temperature with nitrogen (100 ml/min) for 15 minutes; (ii) switch to hydrogen (100 ml/min); (iii) heat to 90° C. over 0.5 hour; (iv) hold for 2 hours at 90° C.; (v) ramp to 300° C. in 2 hour; (vi) then hold for 17 hours at 300° C. At the completion of the 17 hour hold, the catalyst was cooled to 150° C. and the reactor was purged with nitrogen (100 ml/min) at 150° C. for 4 hours. After final cooling the catalyst was ready for use.

Example 2

Catalyst Preparation

Example 2 describes a method for preparing a noble metal supported catalyst. The catalyst was prepared using the same procedure as Example 1, except that during the pretreatment of the support material, the support material was steamed for about 36 hours.

Example 3

Comparative Example

Example 3 describes a method for preparing a noble metal supported catalyst without pre-treating the support material with a gaseous solvent. The catalyst was prepared using the same procedure as Example 1, except that the support material was not pretreated with a gaseous solvent.

Example 4

Use of Supported Catalyst in $H_2O_2$ Process

Example 4 describes a method for manufacturing hydrogen peroxide in a direct synthesis reaction using the catalysts of Examples 1-3. 6.15 g of each of the catalyst manufactured in Example 1-3 (containing 0.35% wt % Pd) was charged to a tubular fixed bed reactor with a nominal diameter of 0.5 inches. The tubular reactor was operated at a pressure of 750 psig, and maintained at an internal temperature of 35° C. The tubular reactor was fed continuously with 2000 sccm (standard cubic centimeters per minute) of a gas feed containing 3 vol % hydrogen, 40 vol % oxygen, and the balance inert gas. The reactor was also fed continuously with 36 cc/hr of a liquid feed containing 4 wt % water, 650 ppmw $H_2SO_4$, and 15 ppmw NaBr and the balance methanol. Gaseous and liquid effluents from the tubular reactor were collected continuously and analyzed to obtain data on the amount of hydrogen converted and the amount of hydrogen peroxide generated. Based on these measurements, the hydrogen conversion for all three examples was determined to be approximately 60%, the selectivity for hydrogen peroxide (based on hydrogen converted) to be approximately 68% and the productivity (g $H_2O_2$ produced per g Pd per hour) to be approximately 200 g $H_2O_2$/g Pd/hr.

To compare the strength of these catalysts, several drum attrition tests were carried out. In this test, a sample is tumbled in a metal drum for over 7 hours at about 60 rpm. The sample is then screened through a 35 mesh screen. The attrition resistance is expressed as a % by weight of the sample that is retained on the screen. The results of the attrition resistance test are shown in chart 1 below.

TABLE 1

| Catalyst | Steaming Time (hrs) | Attrition Resistance (%) |
|---|---|---|
| Example 1 | 18 | 98.8 |
| Example 2 | 36 | 99.5-99.8 |
| Example 3 (Comparative Example) | 0 | 84 |

Supported catalyst manufactured using silica gel pretreated with steam show significant improvements in attrition resistance compared to catalyst manufactured using the same procedure but without steam treating. Surprisingly, the attrition resistance can be achieved without reducing the performance of the catalyst (e.g., as a result of pre-filling the pores of the catalyst support with solvent, which would be expected to greatly reduce capillary suction and/or block the pores altogether thereby theoretically disrupting the ability to introduce catalyst particles into the support pores).

Moreover, catalyst attrition is typically associated with the separation of the catalyst nanoparticles from the support material and/or agglomeration of supported catalyst particles. Catalyst attrition is not typically associated with the catalyst support itself. However, increasing support attrition resistance has been found to greatly reduce overall catalyst attrition in the process for the direct manufacture of hydrogen peroxide. It is believed that the improved attrition resistance is achieved because the catalyst suspension is less likely to crack the catalyst support material when it is mixed with the pretreated support material.

Hydrogen peroxide manufactured using the supported catalysts of the invention has unexpectedly been found to have superior performance when used in organic synthesis reactions compared to hydrogen peroxide manufactured using other known catalysts. It is believed that this unexpected improvement in hydrogen peroxide quality and performance may be due to less contamination in the hydrogen peroxide product as a result of catalyst attrition. Contaminant metals have been found to destabilize hydrogen peroxide into water and oxygen. Reducing contaminant metals is believed to increase stability, quality and performance of the hydrogen peroxide in downstream reactions and uses.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for manufacturing a supported nanocatalyst, comprising,
   (i) exposing a porous support material to a gaseous solvent at a concentration that exceeds atmospheric concentration and for a time period greater than 2 hours in order for the gaseous solvent to be absorbed into the pores of the support material without causing substantial cracking of the porous support material;
   (ii) preparing a nanocatalyst solution by mixing a liquid solvent, a plurality of catalyst atoms, and a plurality of control agent molecules, reacting the plurality of catalyst atoms with the plurality of control agent molecules to form complexed catalyst atoms, and allowing or causing the complexed catalyst atoms to form a plurality of nanoparticles; and
   (iii) impregnating the porous support material with the nanocatalyst solution while at least a portion of the gaseous solvent is still present in the pores of the support material, thereby yielding a supported catalyst.

2. A method as in claim 1, the support material having a size of less than about 50 mm.

3. A method as in claim 1, the support material having a size of less than about 10 mm.

4. A method as in claim 1, the support material having a surface area in a range from about 1 $m^2/g$ to about 2,000 $m^2/g$.

5. A method as in claim 1, the support material having a surface area in a range from about 5 $m^2/g$ to about 1,000 $m^2/g$.

6. A method as in claim 1, the catalyst support material being selected from the group consisting of alumina, silica, titania, kieselguhr, diatomaceous earth, bentonite, clay, zirconia, magnesia, metal oxides, zeolites, and calcium carbonate.

7. A method as in claim 1, the gaseous solvent comprising steam.

8. A method as in claim 1, the liquid solvent comprising water.

9. A method as in claim 1, the control agent molecules comprising small organic molecules or highly branched oligomers or polymers.

10. A method as in claim 1, the control agent molecules comprising straight chain oligomers or polymers.

11. A method as in claim 1, the organic control agent molecules bonding to the catalyst atoms though at least one functional group selected from the group consisting of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide.

12. A method as in claim 1, the metal loading of the catalyst nanoparticles on the support material being in a range from about 0.1 wt% to about 1 wt %.

13. A method for manufacturing a supported nanocatalyst, comprising:
   (i) providing a porous support material;
   (ii) pretreating the porous support material by first preheating the porous support material and then exposing the preheated porous support material to steam in an amount sufficient to substantially prevent cracking when the support material is exposed to an aqueous solvent;
   (iii) providing a colloidal suspension comprising a plurality of catalyst nanoparticles suspended in an aqueous solvent, the suspension comprising an organic control agent and the catalyst nanoparticles being comprised of at least one noble metal;
   and (iv) impregnating the pretreated porous support material with the colloidal suspension to yield a supported catalyst.

14. A method as in claim 13, the support material having an average diameter of less than about 50 mm.

15. A method as in claim 13, the support material having an average diameter of less than about 10 mm.

16. A method as in claim 13, the support material having a surface area in a range from about 1 $m^2/g$ to about 2,000 $m^2/g$.

17. A method for manufacturing hydrogen peroxide, comprising:
   placing the supported catalyst of claim 13 in a reactor; and
   introducing a hydrogen feedstream and an oxygen feedstream into the reactor under conditions suitable for catalyzing the production of hydrogen peroxide using the supported catalyst.

18. A method as in claim 1, the porous support material being exposed to the gaseous solvent for a time period greater than 10 hours.

19. A method as in claim 1, the porous support material being exposed to the gaseous solvent for a time period greater than 20 hours.

20. A method for manufacturing a supported nanocatalyst, comprising:
   (i) providing a porous support material;
   (ii) pretreating the porous support material by first preheating the porous support material and then exposing the preheated porous support material to a gaseous solvent for a time period of at least about 2 hours in order to substantially prevent cracking when the support material is exposed to an aqueous solvent;
   (iii) providing a colloidal suspension comprising a plurality of catalyst nanoparticles suspended in an aqueous solvent, the suspension comprising an organic control agent and the catalyst nanoparticles being comprised of at least one noble metal; and
   (iv) impregnating the pretreated porous support material with the colloidal suspension to yield a supported catalyst.

* * * * *

UNITED STATES PATENT AND TRADEMARK OFFICE
CERTIFICATE OF CORRECTION

PATENT NO. : 7,632,773 B2 Page 1 of 1
APPLICATION NO. : 11/619866
DATED : December 15, 2009
INVENTOR(S) : Zhou et al.

It is certified that error appears in the above-identified patent and that said Letters Patent is hereby corrected as shown below:

Column 11
Line 19, change "over" to --oven--
Line 27, change "2 hour" to --2 hours--

Signed and Sealed this

Thirtieth Day of March, 2010

David J. Kappos
*Director of the United States Patent and Trademark Office*